United States Patent [19]

Chapman et al.

[11] 4,047,090
[45] Sept. 6, 1977

[54] DIGITAL CONTROLLED LOW FREQUENCY POWER AMPLIFIER

[75] Inventors: William L. Chapman; Larry L. Newlin, both of Ponca City, Okla.

[73] Assignee: Continental Oil Company, Ponca City, Okla.

[21] Appl. No.: 661,066

[22] Filed: Feb. 25, 1976

[51] Int. Cl.² ............................................. H02M 5/45
[52] U.S. Cl. ......................................... 363/34; 322/90
[58] Field of Search ................... 321/4, 9 R, DIG. 1; 322/89, 90, 94

[56] References Cited

U.S. PATENT DOCUMENTS

| | | | |
|---|---|---|---|
| 3,246,231 | 4/1966 | Clarke | 321/69 R |
| 3,514,688 | 5/1970 | Martin | 321/9 R |
| 3,654,537 | 4/1972 | Coffey | 321/DIG. 1 |
| 3,971,976 | 7/1976 | Baker | 321/4 |

Primary Examiner—William H. Beha, Jr.
Attorney, Agent, or Firm—William J. Miller

[57] ABSTRACT

An improved digital-controlled power amplifier for low frequency, high power applications. The circuit consists of an alternator with stator windings rewound in a binary sequence for generation of primary power, whereupon pulsed semi-conductive controlled rectifiers are digitally controlled to turn on selected binary combinations of the stator output voltages for summation to produce an output voltage of selected amplitude versus duration; and further, the summed voltage output is switched by a polarity switching bridge to enable generation of a bi-polar output to the circuit load.

6 Claims, 4 Drawing Figures

DIGITAL CONTROLLED LOW FREQUENCY POWER AMPLIFIER

BACKGROUND OF THE INVENTION

1. Field of the Invention

The invention relates generally to high output power amplifiers and, more particularly, but not by way of limitation, it relates to an improved power generation apparatus for use as a current input source in induced polarization data acquisition systems.

2. Description of the Prior Art

In the past, two general types of power amplifiers have been used as induced polarization sources, i.e., power sources suitable for inducing relatively high current values into an earth medium at selected frequency and amplitude. One approach has been to generate a high D-C voltage and to polarity switch the voltage through the load, but such current inducement is limited to a square wave drive at the switching frequency. It has also been known to use specially designed and built D-C generators which are capable of being excited with moderate frequencies. Such units are able to respond to general purpose analog wave forms but are then limited as to the amount of output voltage available. Additional units may be placed in series to increase output voltage, but this then results in problems as to proper synchronization, excessive costs and bulky equipmentation.

SUMMARY OF THE INVENTION

The present invention contemplates a power amplifier which functions under digital control to enable an improved induced polarization current source having requisite power output and controllability as to frequency, amplitude and output duration. The amplifier functions utilizing a primary power source which consists of an alternator having specially wound stator windings which provide binarily related output voltages for further rectification and summing in accordance with digital input control. Control logic circuitry then controls both polarity and output of the summed voltage values to resolve the output voltage at selected wave-shape, frequency and output duration.

Therefore, it is an object of the present invention to provide a highly versatile, general purpose power amplifier for use in induced polarization surveying as well as other low frequency work requiring increased power and control.

It is yet another object of the present invention to provide a digitally-controlled low frequency power amplifier capable of providing an output in any waveform which can be specified by sequences of binary numbers.

It is yet another object of the present invention to provide a power source for an induced polarization surveying system which allows greater control and increased power of current input to an earth medium.

Finally, it is an object of the present invention to provide a high power current source which has greater efficiency and is more economical than the counterpart types of device used heretofore.

Other objects and advantages of the invention will be evident from the following detailed description when read in conjunction with the accompanying drawings which illustrate the invention.

DETAILED DESCRIPTION OF THE INVENTION

Figure 1:
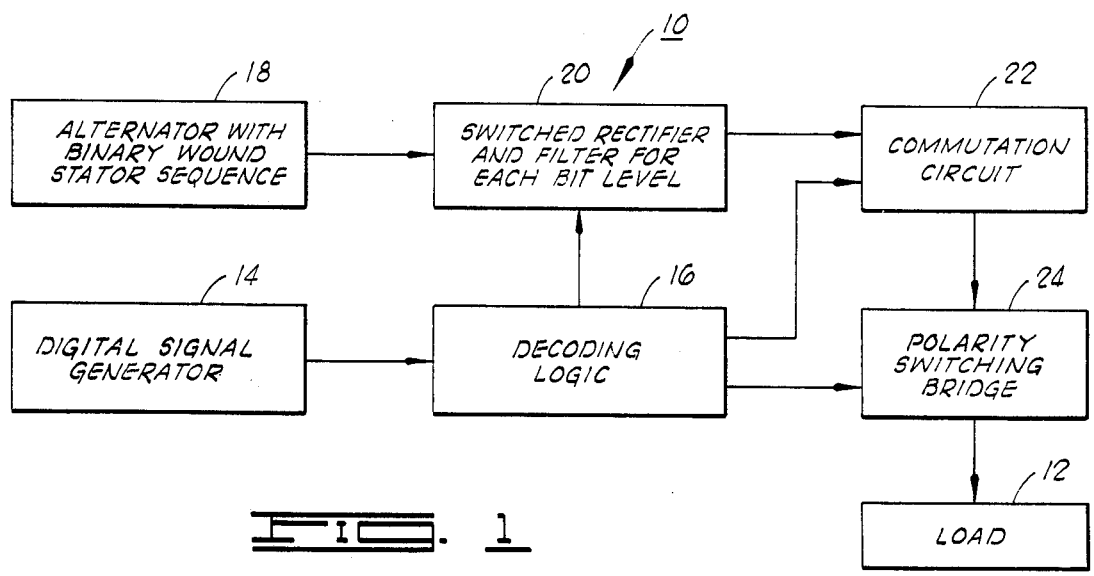
FIG. 1 is a functional block diagram of the present invention.

FIG. 1 illustrates a power amplifier 10 operating into a load 12 as controlled by a digital signal generator 14 and associated decoding logic circuit 16. As previously discussed, power amplifier 10 is primarily intended for power generation and excitation of current input electrodes to an earth medium in an induced polarization surveying system; however, it is well contemplated that such high power amplifier capable of precise frequency, amplitude and duration characteristics may well find application in many areas where exigencies require such equipment. An induced polarization surveying system which may utilize the digital-controlled power amplifier 10 is more fully disclosed in abandoned U.S. Pat. application Ser. No. 324,618 as filed on Jan. 18, 1973, and entitled "Method and Apparatus for Multi-Channel Induced Polarization Surveying." The broad concepts of such surveying systems are well-known and only recent innovative procedures have necessitated current input requirements such as those delivered by the present invention.

Basic power is generated with a rewound alternator, i.e., alternator 18 wherein a plurality of stator windings are wound with successive 2:1 turns ratio in order to output a series of A-C voltages which have amplitudes in binary sequence. The switched rectifier stage 20 then functions to receive each binary winding output for full wave rectification and filtering with conversion from A-C to a binary ratio power output, and output from the series of rectifiers is then summed together to give a uni-polar voltage with varying amplitude for input to a commutation circuit 22 and polarity switching bridge 24. In order to provide bi-polar output, polarity switching bridge 24 alternately reverses current flow through load 12 under control of gated signals from decoding logic 16; however, due to the fact that SCR's are used in switching bridge 24, commutation circuit 22 must function to reverse bias and turn off all SCR stages between polarity alternations.

Control signals are provided by the digital signal generator 14 which may be a general purpose computer or special purpose hardware driver, as will be further described. The code format as presently utilized is the sign/magnitude type with the sign bit used to control commutation circuit 22 and polarity switching bridge 24, and the magnitude bits used to control the rectifiers and filters within rectifier stage 20. Decoding logic circuitry 16 functions to regulate timing and coordination of the commutation and polarity switching functions.

Figure 2:
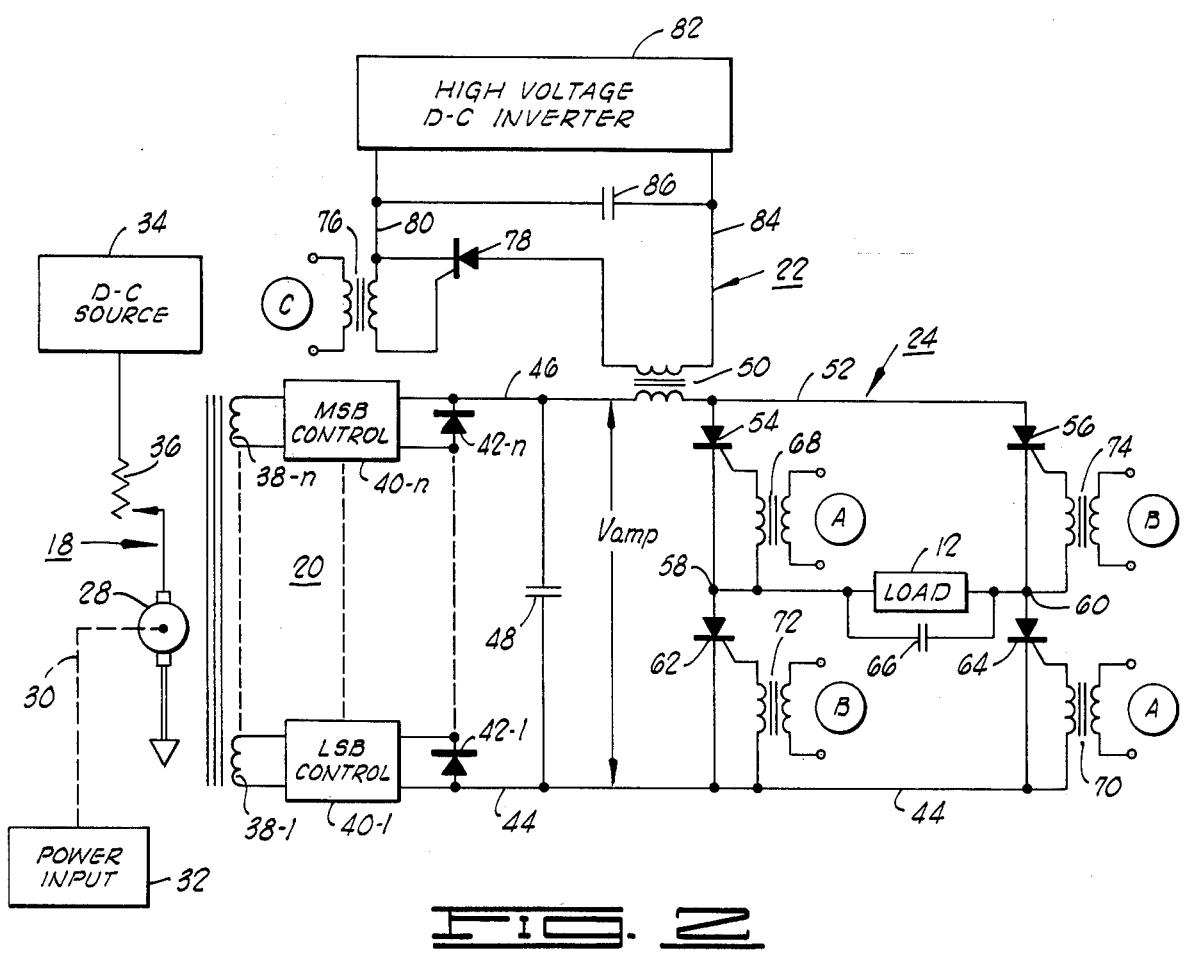
FIG. 2 is a partial schematic diagram of the power amplifier as constructed in accordance with the present invention.

FIG. 2 illustrates a schematic diagram of the major power components of power amplifier 10. The alternator 18 is driven by rotational input via linkage 28 from a suitable power input 30, e.g., a gasoline engine or the like which will provide desired rotational speed input on the order of 4,000 to 5,000 r.p.m. Electrical excitation of rotor 28 is provided by D-C source 34 and rheostat 36 as connected thereto with common return. The speed range of 4,000 to 5,000 r.p.m. is selected since an 8-pole pair alternator will then be capable of delivering an output power frequency range of 500 to 550 Hertz at that speed. Output voltage from the stator windings is directly proportional to rotor speed, and for a given speed is continuously adjustable by varying rotor excitation by means of rheostat 36.

As previously stated, the stator windings 38-1 through 38-n are binarily wound in sequential relationship. Thus, binary switching of the stator voltages to generate the requisite output waveforms requires 2:1 ratio between successive windings. A typical winding sequence in the ratio 32, 16, 8, 4, 2, and 1 is utilized. The actual number of windings 38 required is determined only by consideration of the peak output amplitude and the required resolution which it is desired to achieve. A peak amplitude of 500 volts and a resolution of 8 volts requires 6 windings with an 8-volt level output at the lowest winding. Control of these values would then require a digital control signal of sign/magnitude format having a sign bit and 6 magnitude control bits, i.e., a conventional form of 7-bit digital control signal. For increased amplitude or improved resolution, more control bits may be included.

The A-C voltage from each of stator windings 38-1 through 38-n are then full wave rectified through respective bit controls, LSB control 40-1 (least significant bit) and MSB control 40-n (most significant bit). Respective outputs from bit controls 40-1 through 40-n are then developed across respective output diodes 42-1 through 42-n which are connected in series to provide a summation network providing development of a voltage $V_{dc}$ across leads 44 and 46 and in parallel with capacitor 48. Lead 46 is connected through one winding of a transformer 50 which functions in the commutation circuit 22, as will be further described.

The other side of the winding of transformer 50 is then connected to a lead 52 which constitutes one side of the polarity switching bridge 24. The lead 52 is connected in parallel to the anodes of SCR's 54 and 56 which have their respective cathodes connected to junctions 58 and 60. Junctions 58 and 60 are then connected to the anodes of respective SCR's 62 and 64 each having cathodes connected to lead 44. The bridge circuit is completed by connection of load 12 between junction points 58 and 60, a commutating capacitor 66 being connected in parallel thereto. Opposite ones of the bridge SCR's are connected to the same trigger inputs. Thus, SCR's 54 and 64 are gated on by respective pulse transformers 68 and 70 which receive A input from the decoding logic circuit 16 (FIG. 4), as will be further described. In like manner, remaining SCR's 62 and 56 are triggered from the B output of decoding logic 16 via respective pulse transformers 72 and 74.

The commutation circuit 22 functions to turn off the SCR's of polarity switching bridge 24 by providing reverse bias upon receiving C input from decoding logic circuit 16. C input is applied through a pulse transformer 76 which is connected to gate an SCR 78 having its cathode connected to an output lead 80 of a high voltage D-C inverter 82. The anode of SCR 78 is then connected through the primary side of the pulse transformer 50 to the remaining output 84 of high voltage D-C inverter, and a charging capacitor 86 is connected between the output leads 80 and 84.

Figure 3:
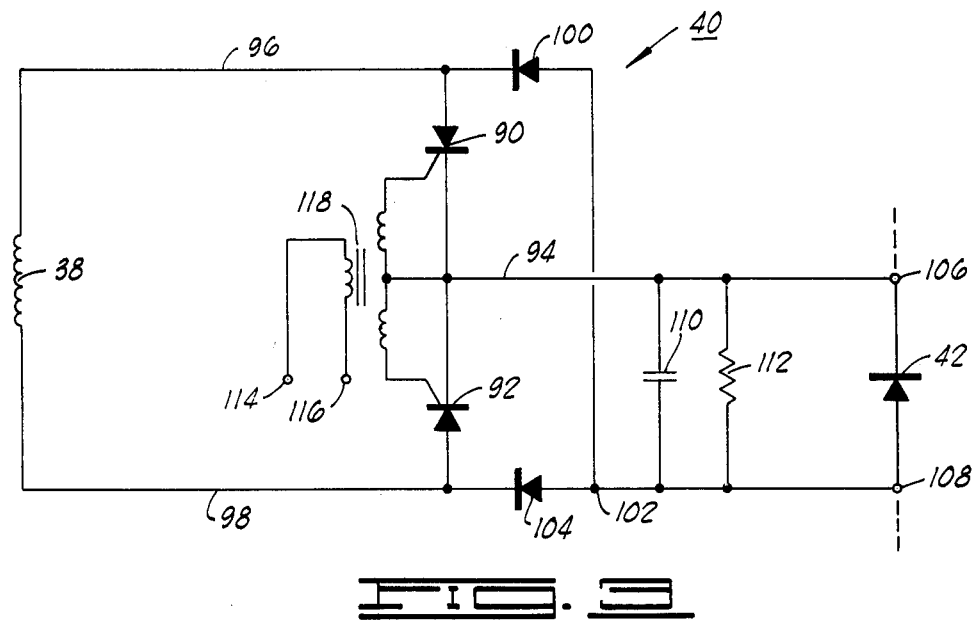
FIG. 3 is a schematic diagram of a bit control circuit as utilized in the invention.

FIG. 3 illustrates in more detail a bit control circuit 40 which functions to receive A-C voltage output from a binarily wound stator winding 38 to provide full wave rectified output across its respective diode 42. The control circuit 40 consists of SCR's 90 and 92 connected common cathode to a lead 94, and having respective anodes connected to leads 96 and 98 as connected to binarily wound stator winding 38. The bridge is completed by a rectifier 100 having cathode connected to lead 96 and anode connected to a junction point 102, and a rectifier 104 having a cathode connected to lead 98 with anode connected to junction point 102. The opposite sides of the bridge, or lead 94 and junction point 102, are then connected to terminals 106 and 108 which contain summation diode 42. The terminals 106 and 108 are connected in a series summation network as shown in FIG. 2, and a filter capacitor 110 and parallel resistor 112 are connected thereacross. Bridge control input to bit control circuit 40 is applied from decoding logic 16 at input terminals 114 and 116 which energizes pulse transformer 118 as connected to the gate electrodes of SCR's 90 and 92.

Figure 4:
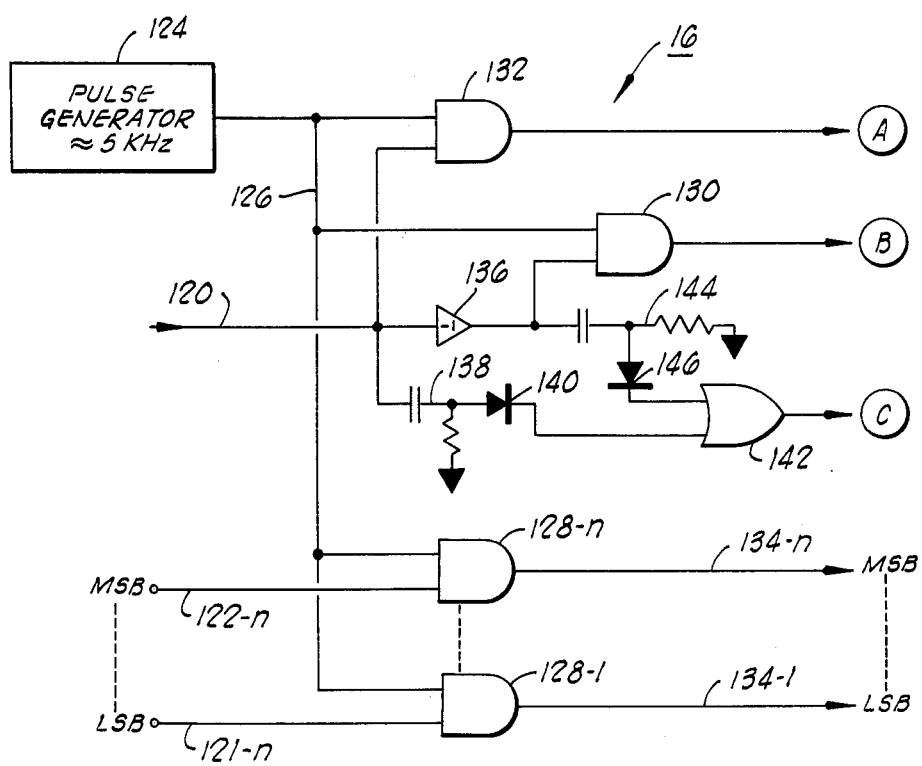
FIG. 4 is a logic circuit diagram of the decoding logic circuitry utilized in the present invention.

FIG. 4 illustrates the decoding logic circuit 16 as controlled by designated inputs from digital signal generator 14. Thus, in accordance with the digital formatting utilized, the sign bit is applied at input 120 while magnitude bits would be applied to respective ones of leads 122-1 through 122-n, i.e., least significant bit through most significant bit. Logic pulse sequence is provided by a pulse generator 124 which provides constant pulse output on a lead 126 to each of AND gates 128-1 through 128-n, 130 and 132. AND gates 128-1 through 128-n provide least through most significant bit outputs via leads 134-1 through 134-n, and these outputs would be analogous to the control input leads 114 and 116 to bit control circuit 40, as shown in FIG. 3.

The sign bit input lead 120 is applied to the remaining input of AND gate 132 as well as to an inverter 136 and a differentiating network 138 through series diode 140 to an OR gate 142. The output of inverter 136 is connected to the remaining input of AND gate 130 as well as through a differentiating network 144 and diode 146 to the remaining gate of OR gate 142. As will be further described, AND gate 132 provides A output to polarity switching bridge 24, AND gate 130 provides B output to polarity switching bridge 24, and OR gate 142 provides C output for application to commutation circuit 22.

OPERATION

Initial preparation is made through digital signal generator 14 to provide the necessary sign/magnitude format output digital signal which will accomplish control that provides the desired output voltage across load 12. Power input is then applied to the rotor 28 of alternator 18 and the binarily related A-C voltages are provided out from each of stator windings 38-1 through 38-n for rectification across respective bit controls 40-1 through 40-n. Referring to FIG. 3, when a particular magnitude bit is true, a continuous pulse train is applied to the pulse transformer 118 of that bit control to assure that the SCR's stay turned on for that duration. With the SCR's 90 and 92 turned on, the bridge functions as a typical 4-diode bridge, and output is a double frequency, positive amplitude which is then filtered to its effective value by the filter consisting of capacitor 110 and resistor 112. Thus, the filtered output across terminals 106 and 108 for each bit is a binary ratio voltage value proportional to the A-C winding output voltage when the bit is true, and it is zero at all other times.

Referring again to FIG. 2, it can be seen that when a particular magnitude bit is "on" its associated diode 42-1 through 42-n is reverse biased and output current flows through the voltage rise of this bit. When the bit is turned "off," output current will flow through the respective diode 42-1 through 42-n. The voltage $V_{amp}$ will then be the sum of all voltage rises from all of bit controls 40-1 through 40-n which are turned "on."

Polarity switching bridge 24 functions to reverse current flow of output voltage V through load 12, and thereby provides for a bi-polar output. Gated pulse trains are applied to both SCR pulse transformers 68 and 70, the input A control, in order to drive current through load 12 in one direction. Alternatively, these are turned "off" and the SCR's 62 and 74 are turned "on" by input B control to respective pulse transformers 72 and 74 to reverse current flow through load 12. The uni-polar amplitude function V is always positive and doesn't provide the negative voltage necessary to shut the bridge SCR's off, i.e., all SCR's 54, 56, 62 and 64. Shutting off of the bridge SCR's is accomplished by the commutation circuit 22. Between the times when the sign bit changes, high voltage inverter 82 charges capacitor 86 to its peak voltage. Upon occurrence of change of sign bit input via input 120 (FIG. 4), a C pulse input is applied to the commutation SCR 78 which, in turn, discharges capacitor 86 through the commutation transformer 50. This results in a sharp rise time, high power pulse being generated in the secondary of transformer 50, and the pulse is applied in reverse polarity to the polarity switching bridge 24 to shut off all of SCR's 54, 56, 62 and 64. The capacitor 48 serves the dual function of protecting the drive circuit from the commutation pulse, and along with capacitor 66, serves to force all of the commutation pulse to appear across the SCR's of polarity switching bridge 24.

Referring more particularly to FIG. 4, basic control logic consists of the sign and magnitude digital codes from the associated computer or digital signal generator 14 as input for use as gating signals to gate approximately five kiloHertz pulses to the respective SCR circuits. Four different functions are provided which include commutation and bridge switching when the sign bit changes, and amplitude control as effected by the magnitude bits. With a positive sign bit applied via lead 120, the AND gate 132 is turned "on" to pass pulses as control output A which drives the respective SCR's 54 and 64 of FIG. 2. The gate output of five kiloHertz pulses serves first to turn the SCR's "on," and it then further assures that the SCR's remain in the "on" state until cessation of pulse output from AND gate 132. When the sign bit on input 120 changes state, inverter 136 functions to apply input to OR gate 142 such that a positive pulse appears at the control output C, and this occurs for either a positive going or negative going transition. The control ouput C is then applied to control commutation circuit 22 (See FIG. 2) which turns off any SCR's of polarity switching bridge 24 which may be in the "on" state. AND gate 130, as enabled by sign bit inversion by inverter 136, generates an alternate series of five kiloHertz pulses which function to provide the control output B as applied to energize SCR's 56 and 62 of polarity switching bridge 24. Control output B once enabled will remain "on" until turned "off" by the next commutation pulse, i.e., generation of control output C upon sign bit change at input lead 120.

Each amplitude control bit, LSB through MSB as present on inputs 122-1 through 122-n functions to enable gates 128-1 through 128-n to gave five kiloHertz pulses to its respective bit control 40 (See FIG. 2). Application of the five kiloHertz pulses to selected ones of bit control 40-1 through 40-n serve to keep the rectifier turned "on" until the bit goes false. The SCR's 90 and 92 in each of respective bit controls 40-1 through 40-n are turned "off" by the negative swing of the A-C voltage in each of the respective alternator windings 38-1 through 38-n of alternator 18.

The foregoing discloses a novel power amplifier which is digitally controlled and capable of generating primary power having precise frequency and amplitude control, and the amplifier is particularly desirable in induced polarization surveying. The amplifier so constructed enables a much more compact and easily transportable equipment which is yet capable of generating the very high values of current input to an earth medium as is desirable in geophysical surveying systems. While the digitally controlled power amplifier has been specifically referenced for use in induced polarization systems, it should be well understood that the similar type of amplifier may find any and varied uses in completely diverse applications or technologies due to its unique controllability features, especially as regards power generation applications at low frequencies with precise wave form control.

Changes may be made in the combination and arrangement of steps as heretofore set forth in the specification and shown in the drawings; it being understood that changes may be made in the embodiments disclosed without departing from the spirit and scope of the invention.

What is claimed is:

1. A power amplifier comprising:
   means for generating a plurality of A-C voltages which are binarily related in amplitude;
   means for rectifying selected ones of said binarily related A-C voltages to produce respective binarily related rectified and filtered voltages;
   means for summing the respective ones of said plurality of binarily related rectified and filtered voltages to provide an output voltage;
   a polarity switching bridge receiving said output voltage, said bridge consisting of first and second controlled rectifiers having common anode connection to said output voltage and having cathodes connected via first and second junctions to anodes of third and fourth controlled rectifiers which have common cathode connection to the output voltage common;
   logic circuit means alternately providing first and second gate outputs for energizing alternately said first and fourth controlled rectifiers;
   commutation circuit means energizable upon alternation of first and second gate outputs from said logic circuit means to generate reverse bypass voltage across said polarity switching bridge to turn off all controlled rectifiers; and
   load means connected between said first and second junctions of said bridge configuration to be energized by said output voltage.

2. A power amplifier as set forth in claim 1 wherein said means for generating comprises:
   a D-C electrical source;
   an alternator energized by said D-C electrical source, and having a rotor and stator with successive ones of plural stator windings wound in binary relationship; and power input means providing rotational input to the alternator rotor.

3. A power amplifier as set forth in claim 1 wherein said commutation circuit means comprises:

a high voltage D-C source; and a controlled rectifier gated on by alternation of said first and second gate outputs to apply said high voltage in reverse bias across said polarity switching bridge means controlled rectifiers.

4. A power amplifier as set forth in claim 1 wherein each of said means for rectifying comprise:

full wave rectifier means connected to receive one of said A-C voltages and including controlled rectifier means which is energizable to enable said full wave rectifier means to provide a rectified and filtered voltage output.

5. A power amplifier as set forth in claim 4 which is further characterized to include:

digital circuit means for generating a plurality of magnitude gate outputs each of which is connected to energize a controlled rectifier means of a respective full wave rectifier means to produce a binarily related voltage.

6. A power amplifier means as set forth in claim 5 wherein said digital circuit means comprises:

digital signal generator means controllable to provide plural magnitude bit outputs and a sign bit output;

logic circuit means receiving all of said bit outputs and responsive to generate a magnitude gate output to the controlled rectifier of each full wave rectifier means, and receiving said sign bit output to generate plural polarity control gate outputs; and bridge rectifier means receiving said output voltage and controlled by said polarity control gate outputs to periodically reverse the direct current flow through said load means.

* * * * *